(12) United States Patent
Tazuru et al.

(10) Patent No.: US 11,945,052 B2
(45) Date of Patent: Apr. 2, 2024

(54) BRAZING MATERIAL APPLICATION METHOD AND MANUFACTURING METHOD OF METAL MEMBER FOR BRAZING

(71) Applicant: HARIMA CHEMICALS, INC., Hyogo (JP)

(72) Inventors: Aoi Tazuru, Hyogo (JP); Satoshi Moriya, Hyogo (JP); Daigo Kiga, Hyogo (JP); Tomoaki Akazawa, Hyogo (JP)

(73) Assignee: HARIMA CHEMICALS, INC., Hyogo (JP)

( * ) Notice: Subject to any disclaimer, the term of this patent is extended or adjusted under 35 U.S.C. 154(b) by 0 days.

(21) Appl. No.: 17/788,060

(22) PCT Filed: Dec. 25, 2020

(86) PCT No.: PCT/JP2020/049027
§ 371 (c)(1),
(2) Date: Jun. 22, 2022

(87) PCT Pub. No.: WO2021/132689
PCT Pub. Date: Jul. 1, 2021

(65) Prior Publication Data
US 2023/0044980 A1 Feb. 9, 2023

(30) Foreign Application Priority Data
Dec. 27, 2019 (JP) .................. 2019-239170

(51) Int. Cl.
*B23K 3/00* (2006.01)
*B23K 3/06* (2006.01)
(52) U.S. Cl.
CPC .................. *B23K 3/0638* (2013.01)

(58) Field of Classification Search
CPC ........ B23K 1/00–206; B23K 3/00–087; B05D 7/14; B05D 3/00; B05D 7/24
(Continued)

(56) References Cited

U.S. PATENT DOCUMENTS

| 4,832,246 A | * | 5/1989 | Ono | ................. B23K 3/00 228/56.3 |
| 2003/0012667 A1 | | 1/2003 | Maruyama et al. | |

(Continued)

FOREIGN PATENT DOCUMENTS

| CA | 2681166 C | * | 3/2018 | ............. B23K 35/02 |
| CN | 101119804 A | * | 2/2008 | ........... B05C 5/0225 |

(Continued)

OTHER PUBLICATIONS

International Search Report dated Mar. 16, 2021 in International (PCT) Application No. PCT/JP2020/049027.

(Continued)

*Primary Examiner* — Kiley S Stoner
(74) *Attorney, Agent, or Firm* — Wenderoth, Lind & Ponack, L.L.P.

(57) ABSTRACT

The present invention provides a brazing material application method that can stably discharge a brazing material containing a fluoride-based flux over a long period of time. The brazing material application method of the present invention includes: a supply step of supplying a liquid brazing material containing a fluoride-based flux to a liquid chamber of a discharge apparatus that is configured to have the liquid chamber having a discharge channel, a plunger disposed in the liquid chamber movably forward and backward, and a drive device for moving the plunger forward and backward and to satisfy a predetermined relationship; and an application step of discharging the brazing material in the liquid chamber from the discharge channel by moving the (Continued)

plunger toward the discharge channel of the liquid chamber by the drive device, and applying the brazing material to a metal member.

8 Claims, 3 Drawing Sheets

(58) Field of Classification Search
USPC .............. 228/33, 41, 255–262, 248.1–248.5; 222/591–607
See application file for complete search history.

(56) References Cited

U.S. PATENT DOCUMENTS

| | | | |
|---|---|---|---|
| 2006/0237514 A1* | 10/2006 | Wagou | B23K 3/0615 228/37 |
| 2010/0080912 A1 | 4/2010 | Koyama et al. | |
| 2014/0217127 A1 | 8/2014 | Ikushima | |

FOREIGN PATENT DOCUMENTS

| | | | | |
|---|---|---|---|---|
| CN | 104625483 A | * | 5/2015 | ........... B23K 35/362 |
| CN | 103038014 B | * | 3/2016 | ........... B23K 1/0012 |
| CN | 109093223 A | * | 12/2018 | ........... B23K 3/0607 |
| CN | 110121394 A | * | 8/2019 | ............... B23K 1/00 |
| CN | 110315241 | | 10/2019 | |
| GB | 2293786 A | * | 4/1996 | ............. B23K 1/203 |
| JP | 10-193086 | | 7/1998 | |
| JP | H10507688 A | * | 7/1998 | |
| JP | 2001191176 A | * | 7/2001 | |
| JP | 2002-301414 | | 10/2002 | |
| JP | 2004031927 A | * | 1/2004 | ......... B05C 11/1034 |
| JP | 3534450 | | 3/2004 | |
| JP | 2006346681 A | * | 12/2006 | |
| JP | 2007073869 A | * | 3/2007 | ............... B23K 1/20 |
| JP | 2010-87320 | | 4/2010 | |
| JP | 2013-17945 | | 1/2013 | |
| JP | 2018-51580 | | 4/2018 | |
| KR | 890006439 Y1 | * | 9/1989 | |
| KR | 20170142570 A | * | 12/2017 | |
| WO | WO-0160559 A1 | * | 8/2001 | ........... B23K 3/0607 |
| WO | WO-2010069066 A1 | * | 6/2010 | ........... B23K 1/0016 |
| WO | WO-2012150105 A1 | * | 11/2012 | ........... B23K 3/0623 |
| WO | 2019/011672 | | 1/2019 | |

OTHER PUBLICATIONS

Extended European Search Report dated Dec. 1, 2023 in corresponding European Patent Application No. 20904726.5.

* cited by examiner

BRAZING MATERIAL APPLICATION METHOD AND MANUFACTURING METHOD OF METAL MEMBER FOR BRAZING

TECHNICAL FIELD

The present invention relates to a brazing material application method and a manufacturing method of a metal member for brazing.

BACKGROUND ART

Conventionally, when welding metal members, flux is used to remove oxides formed on surfaces of the metal members to be welded.

Since the flux is usually used as a liquid composition, when the flux is applied to a welded portion, the flux may flow from the welded portion, which may cause the problem of making it impossible to accurately apply the flux only to the welded portion. Furthermore, a drying facility is required to solidify a coating, which may lead to complexities in a production line.

Therefore, the use of solid flux has been studied in order to accurately apply the flux to the welded portion and to simplify the production line.

Patent Literature 1 discloses a droplet discharge method where a small amount of a liquid containing solids can be discharged. Specifically, Patent Literature 1 discloses a droplet discharge method using a droplet discharge apparatus, which includes a discharge channel whose tip constitutes a discharge opening, a plunger, a liquid chamber into which the plunger is inserted, a plunger drive mechanism for moving the plunger forward and backward, and a plunger positioning mechanism for defining the position of the tip of the plunger. The method includes: extruding a liquid material by an amount required to form a desired droplet out of the discharge opening by moving the plunger forward; and dividing the liquid material extruded from the discharge opening to form a minute amount of droplet by sequentially moving the plunger backward.

CITATION LIST

Patent Literature

Patent Literature 1: Japanese Patent Application Laid-Open No. 2013-17945

SUMMARY OF INVENTION

Technical Problem

The above-described droplet discharge method is capable of discharging liquid materials ranging from a low viscosity material such as water, a solvent, and a reagent to a high viscosity material such as solder paste, silver paste, and an adhesive in minute amounts.

However, the flow characteristics differ between low viscosity materials and high viscosity materials when in a liquid state. Also, when solids are contained in a liquid material, the solids flow according to the viscosity characteristics of the liquid material, but Patent Literature 1 does not sufficiently verify the differences in these characteristics.

Therefore, when a liquid brazing material containing a fluoride-based flux, which is a solid material, is discharged using the above-described droplet discharge method, the brazing material tends to clog the apparatus, which may cause the problem of making it difficult to discharge the brazing material stably over a long period of time.

The present invention provides a brazing material application method that can stably discharge a brazing material containing a fluoride-based flux over a long period of time, and a manufacturing method of a metal member for brazing using this brazing material application method.

Solution to Problem

A brazing material application method of the present invention includes:

a supply step of supplying a liquid brazing material containing a fluoride-based flux to a liquid chamber of a discharge apparatus that is configured to have the liquid chamber having a discharge channel, a plunger disposed in the liquid chamber movably forward and backward, and a drive device for moving the plunger forward and backward and to satisfy the formula 1; and an application step of discharging the brazing material in the liquid chamber from the discharge channel by moving the plunger toward the discharge channel of the liquid chamber by the drive device, and applying the brazing material to a metal member, wherein

[inner diameter (mm) of discharge channel]$^2$×1000/ (average particle diameter of fluoride-based flux)>0.85        Formula 1.

A manufacturing method of a metal member for brazing of the present invention includes:

supplying a liquid brazing material containing a fluoride-based flux to a liquid chamber of a discharge apparatus that is configured to have the liquid chamber having a discharge channel, a plunger disposed in the liquid chamber movably forward and backward, and a drive device for moving the plunger forward and backward and to satisfy the above-described formula 1; and discharging the brazing material in the liquid chamber from the discharge channel by moving the plunger to the discharge channel of the liquid chamber by the drive device, and applying the brazing material to a metal member, to manufacture a metal member for brazing in which a coating of the brazing material is applied to the metal member.

Advantageous Effects of Invention

In the brazing material application method of the present invention, the inner diameter of the discharge channel, which is provided in the liquid chamber to discharge the brazing material, and the average particle diameter of the fluoride-based flux contained in the brazing material satisfy the formula 1, so it is possible to discharge the brazing material containing a fluoride-based flux powder from the discharge channel without causing clogging, which results in stably applying the brazing material to the metal member over a long period of time and stably forming a coating of the brazing material on the metal member.

DESCRIPTION OF EMBODIMENTS

Figure 1:
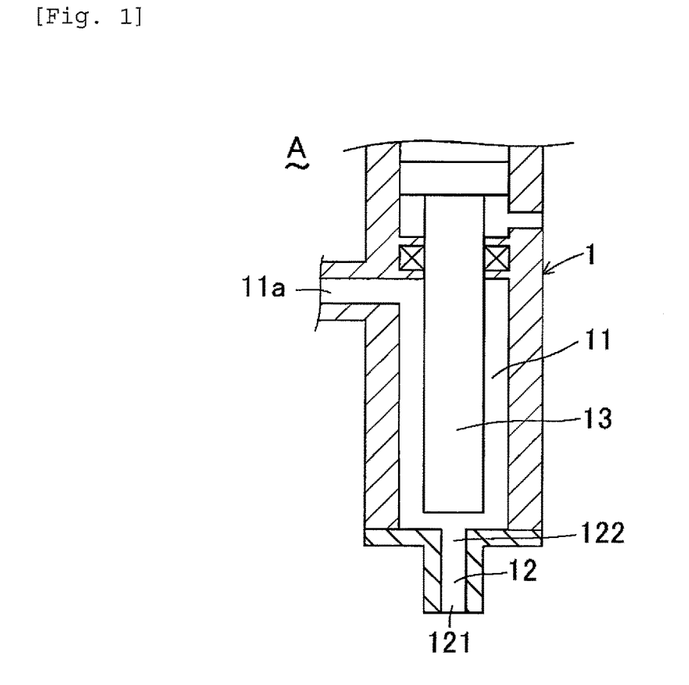
FIG. 1 is a schematic diagram illustrating an example of a discharge apparatus.

An example of a brazing material application method of the present invention will be described with reference to the drawings. A discharge apparatus A used in the brazing material application method has an apparatus body 1 as illustrated in FIG. 1. This apparatus body 1 is formed with a liquid chamber 11 in which a liquid brazing material can be filled.

The liquid chamber 11 of the apparatus body 1 is integrally or detachably provided with a discharge channel 12 for discharging the liquid brazing material filling the liquid chamber 11 to a metal member, and the liquid chamber 11 communicates with the external environment through the discharge channel 12. That is, the discharge channel 12 is configured such that its inner end opens into the liquid chamber 11 and its outer end opens to an outer surface of the apparatus body 1 so that the liquid brazing material is discharged from an outer opening 121 of the discharge channel 12 toward the metal material. The shape of the discharge channel is not particularly limited. The cross-sectional shape of the discharge channel 12 in a plane perpendicular to a flow direction of the brazing material may vary in a discharge direction (flow direction) of the brazing material. The cross-sectional shape of the discharge channel 12 in a plane perpendicular to the flow direction of the brazing material is preferably a circle (including a perfect circle and an oval). The cross-sectional shape of the discharge channel 12 in a plane parallel to the flow direction of the brazing material may also vary.

The discharge channel 12 is determined as follows. Of planes that are perpendicular to a reciprocating direction of a plunger 13, which will be described later, and pass through a contact point between the plunger 13 and an inner wall surface of the liquid chamber 11 when the plunger 13 is moved forward to come into contact with the inner wall surface of the liquid chamber 11, a plane that is located most downstream in the flow direction of the brazing material is referred to as a first reference plane. Of portions through which the brazing material is flowed, a portion that is located downstream from the above-described first reference plane in the flow direction of the brazing material is referred to as a discharge channel. Note that, in a case in which the plunger 13 does not make contact with the inner wall surface of the liquid chamber 11 in the application step, a trajectory of reciprocating motion of the plunger 13 in the application step is extended in a straight line in the flow direction of the brazing material, and this extended portion is defined as a virtual trajectory. On the virtual trajectory, the plunger 13 is moved virtually in the flow direction of the brazing material, and the plunger 13 is virtually brought into contact with the inner wall surface of the liquid chamber 11 to identify the contact point between the plunger 13 and the inner wall surface of the liquid chamber 11. The discharge channel can thus be determined in the same manner as described above.

Note that the liquid chamber 11 may be constituted of a single liquid chamber component or a combination of multiple liquid chamber components. The liquid chamber 11 constituted of a plurality of liquid chamber components may include some of the liquid chamber components that are replaceable and removable. The discharge channel 12 is preferably provided in the removable and replaceable liquid chamber components. The discharge channel 12 may be constituted of a single member or a plurality of members.

The liquid chamber 11 of the apparatus body 1 is configured to be formed with an inlet port 11a for supplying the brazing material into the liquid chamber 11, and the brazing material, which is heated to a liquid state as needed, is supplied and filled into the liquid chamber 11 through the inlet port 11a.

The discharge apparatus may be provided with a first heating device (not illustrated), such as a heater, to heat the brazing material to a liquid state as needed, when the brazing material is solid [solid at 1 atm (101.325 kPa) and 25° C.]

In addition, a stirrer (not illustrated) may be provided to stir the liquid brazing material supplied into the liquid chamber 11 and keep powdered materials, such as the fluoride-based flux, contained in the brazing material, uniformly dispersed in the brazing material.

The plunger 13 is installed in the liquid chamber 11, in which it can be moved forward and backward in directions close to and away from the discharge channel 12 of the liquid chamber 11. Note that the plunger is moved forward and backward by a not-illustrated drive device (for example, an actuator using air pressure or hydraulic pressure, a motor, a spring, or the like).

The plunger 13 is configured to be retreated to a position away from an inner opening 122, in the liquid chamber 11, of the discharge channel 12 while the brazing material is being supplied and filled in the liquid chamber 11, so that a space for filling the brazing material is secured in the liquid chamber 11.

On the other hand, the plunger 13 is configured to move, in the liquid chamber 11, in the direction close to the inner opening 122 of the discharge channel 12, after the brazing material is filled in the liquid chamber 11, so that the brazing material in the liquid chamber 11 is extruded and discharged from the outer opening 121 of the discharge channel 12. When the brazing material in the liquid chamber 11 is extruded by the plunger 13, the plunger 13 may be moved forward in the direction close to the inner opening 122 of the discharge channel 12 until the plunger 13 comes into contact with the inner wall surface of the liquid chamber 11. The forward movement may also be stopped before the plunger 13 comes into contact with the inner wall surface of the liquid chamber 11 (without touching the inner wall surface of the liquid chamber 11) and the plunger 13 may be moved backward in the direction away from the inner opening 122 of the discharge channel 12.

Thus, the plunger 13 is configured to, by reciprocating at a constant stroke, repeatedly fill the space formed in the liquid chamber 11 with the brazing material and extrude the brazing material filled in the space, and to intermittently discharge the liquid brazing material filled in the liquid chamber 11 as droplets from the discharge channel 12.

The shape of a tip of the plunger 13 is not particularly limited. The cross-sectional shape of the tip of the plunger 13 in a plane parallel to the flow direction of the brazing material may be a rectangle as illustrated in FIG. 1, a trapezoid or a convex arc.

When the plunger 13 retreats to a position away from the inner opening 122 of the discharge channel 12, a space is formed in the liquid chamber 11, and the brazing material is supplied and filled into this space through the inlet port 11a. The brazing material is stored in a container (not illustrated) before being supplied into the space of the liquid chamber 11. The container may be provided with a second heating device (not illustrated) to heat the brazing material to a liquid state as needed. The brazing material stored in the container is constantly subjected to pressure (liquid feed pressure) by a pressurizing device (not illustrated) to supply and fill the brazing material stored in the container into the liquid chamber 11. Note that the brazing material is not discharged from the discharge channel 12 only by the pressure applied by the pressurizing device to the brazing material in the container.

The pressure (liquid feed pressure) applied to the brazing material in the container is preferably 1 kPa or more, and more preferably 5 kPa or more, and yet more preferably 10 kPa or more from the viewpoint of securing the filling in the space of the liquid chamber 11. The pressure (liquid feed pressure) applied to the brazing material in the container is preferably 500 kPa or less, more preferably 300 kPa or less, and yet more preferably 100 kPa or less from the viewpoint of application fineness (described later).

Here, the brazing material contains a fluoride-based flux powder. Therefore, while the brazing material is being discharged in the form of a droplet through the discharge channel 12 of the liquid chamber 11 to the metal member, the fluoride-based flux may cause clogging of the discharge channel 12. As a result of various investigations, the inventors have found that when the inner diameter of the discharge channel provided in the liquid chamber 11 of the apparatus body 1 in the discharge apparatus A and the average particle diameter of the fluoride-based flux contained in the brazing material satisfy a predetermined relationship, the brazing material can be stably discharged in the form of a droplet from the discharge channel of the discharge apparatus without causing clogging of the discharge channel due to the brazing material containing the fluoride-based flux powder.

That is, the above-described discharge apparatus is used to discharge the liquid brazing material containing the fluoride-based flux powder in the form of a droplet from the discharge channel 12, in order to apply the brazing material to the metal member and form a coating of the brazing material on the metal member. The discharge apparatus satisfies the following formula 1, so that it is possible to prevent clogging of the discharge channel 12 caused by the fluoride-based flux.

$$[\text{inner diameter (mm) of discharge channel}]^2 \times 1000 / (\text{average particle diameter (μm) of fluoride-based flux}) > 0.85 \qquad \text{Formula 1}$$

The reason why satisfying the formula 1 prevents clogging of the discharge channel 12 with the brazing material containing the fluoride-based flux is not clearly understood, but the reason is assumed to be as follows.

Since the fluoride-based flux powder is an agglomerate of needle-like and plate-like crystals, the fluoride-based flux powder has a large surface area and is easily affected by external environments. Therefore, the fluoride-based flux powder is susceptible to destabilization and agglomeration in the discharge channel 12 due to changes in environment caused by the wall surface of the discharge channel. When the value obtained by dividing the square of the inner diameter of the discharge channel by the average particle diameter of the fluoride-based flux is equal to or more than a predetermined value, the fluoride-based flux powder can be prevented from agglomerating and staying in the discharge channel 12, so it is assumed that clogging of the discharge channel caused by the brazing material can be effectively suppressed.

Also, the discharge apparatus preferably satisfies the following formula 3, more preferably satisfies the following formula 4, and yet more preferably satisfies the following formula 5.

$$[\text{inner diameter (mm) of discharge channel}]^2 \times 1000 / (\text{average particle diameter (μm) of fluoride-based flux}) > 1 \qquad \text{Formula 3}$$

$$[\text{inner diameter (mm) of discharge channel}]^2 \times 1000 / (\text{average particle diameter (μm) of fluoride-based flux}) > 1.5 \qquad \text{Formula 4}$$

$$[\text{inner diameter (mm) of discharge channel}]^2 \times 1000 / (\text{average particle diameter (μm) of fluoride-based flux}) > 2.0 \qquad \text{Formula 5}$$

It is also preferable that the discharge apparatus satisfy the following formula 6.

$$500 > [\text{inner diameter (mm) of discharge channel}]^2 \times 1000 / (\text{average particle diameter (μm) of fluoride-based flux}) \qquad \text{Formula 6}$$

The inner diameter of the discharge channel is a value measured in the following manner. In any section by which the discharge channel is cut in a plane perpendicular to the flow direction of the brazing material flowed in the discharge channel, the diameter (hereinafter referred to as "first diameter") of a perfect circle with the largest diameter enclosed by the section is measured. The smallest diameter of the first diameters is defined as the "inner diameter of the discharge channel". A plane in which the first diameter of the discharge channel is identified as the inner diameter (the plane perpendicular to the flow direction of the brazing material flowed in the discharge channel) is referred to as a second reference plane.

To measure the average particle diameter of the fluoride-based flux (secondary particles), 1 g of the fluoride-based flux is heated at 250° C. for 5 hours and then dispersed in isopropyl alcohol to produce a 1 mass % isopropyl alcohol dispersion liquid, which is then sonicated for 10 minutes. After that, using the dispersion liquid, a calculated average diameter on a volume basis is measured by a dynamic light scattering particle size analyzer. As the dynamic light scattering particle size analyzer, an apparatus that is commercially available, for example, from MicrotracBEL Corp. under the product name "MT3000 II" can be used.

The inner diameter of the discharge channel 12 in the discharge apparatus A is preferably 0.1 mm or more. When the inner diameter of the discharge channel is 0.1 mm or more, clogging of the discharge channel 12 with the brazing material can be suppressed.

The inner diameter of the discharge channel 12 in the discharge apparatus A is preferably 1.2 mm or less, more preferably 0.76 mm or less, and yet more preferably 0.29 mm or less. The discharge channel with the inner diameter of 1.2 mm or less can prevent a droplet of the brazing material discharged from the discharge channel from scattering after colliding against the metal member, so the brazing material can be accurately applied to a desired part of the metal member and a coating of the brazing material can be accurately formed on the metal member.

On the other hand, as machines such as heat exchangers have become thinner and lighter in recent years, the shapes of metal members that constitute these machines have become more complex, and while the number of welded joints between the metal members has increased. The welded joints are tending to become smaller.

Therefore, in applying the brazing material to the metal members, it is necessary to accurately supply a required amount of the brazing material to desired parts of the metal members in a minute range.

In the above-described discharge apparatus, when the inner diameter of the discharge channel provided in the liquid chamber, the travel distance of the plunger in forward and backward movement directions, and the average particle diameter of the fluoride-based flux satisfy the following formula 2, a required amount of the brazing material can be applied to a desired part of the metal member in a minute range with high accuracy. The travel distance of the plunger in the forward and backward movement directions (stroke distance) refers to a travel distance of the plunger from a state in which the plunger is moved away from the discharge channel in the liquid chamber to fill the liquid brazing material in the liquid chamber to a state in which the plunger is moved forward the most toward the discharge channel. The inner diameter of the discharge channel and the average particle diameter of the fluoride-based flux are the same as those described above.

[inner diameter (mm) of discharge channel]$^2$×(travel distance (mm) of plunger in forward and backward movement directions)×(average particle diameter (μm) of fluoride-based flux)×1000<120   Formula 2

As described above, in the discharge apparatus, the inner diameter of the discharge channel 12, the travel distance of the plunger in the forward and backward movement directions (stroke distance), and the average particle diameter (μm) of the fluoride-based flux satisfy the formula 2, so that the amount of the brazing material to be discharged at one time can be adjusted and the liquid brazing material can be discharged from the discharge channel 12 as a droplet of an appropriate size. As a result, an appropriate amount of the brazing material can be applied to the desired part of the metal member with high accuracy.

In the discharge apparatus, the inner diameter of the discharge channel 12 of the liquid chamber 11, the travel distance of the plunger 13 in the forward and backward movement directions (stroke distance), and the average particle diameter (μm) of the fluoride-based flux preferably satisfy the following formula 7, more preferably satisfy the following formula 8, yet more preferably satisfy the following formula 9, and yet more preferably satisfy the following formula 10.

[inner diameter (mm) of discharge channel]$^2$×(travel distance (mm) of plunger in forward and backward movement directions)×(average particle diameter (μm) of fluoride-based flux)×1000<1300   Formula 7

[inner diameter (mm) of discharge channel]$^2$×(travel distance (mm) of plunger in forward and backward movement directions)×(average particle diameter (μm) of fluoride-based flux)×1000<120   Formula 8

[inner diameter (mm) of discharge channel]$^2$×(travel distance (mm) of plunger in forward and backward movement directions)×(average particle diameter (μm) of fluoride-based flux)×1000<105   Formula 9

[inner diameter (mm) of discharge channel]$^2$×(travel distance (mm) of plunger in forward and backward movement directions)×(average particle diameter (μm) of fluoride-based flux)×1000<42   Formula 10

In the discharge apparatus, the inner diameter of the discharge channel 12, the travel distance of the plunger 13 in the forward and backward movement directions (stroke distance), and the average particle diameter (μm) of the fluoride-based flux preferably satisfy the following formula 11.

0.7<[inner diameter (mm) of discharge channel]$^2$×(travel distance (mm) of plunger forward and backward movement directions)×(average particle diameter (μm) of fluoride-based flux)×1000   Formula 11

The travel distance of the plunger 13 in the forward and backward movement directions (stroke distance) is preferably 0.01 mm or more, and more preferably 0.05 mm or more, from the viewpoint of preventing clogging of the discharge channel with the brazing material. The travel distance of the plunger 13 in the forward and backward movement directions (stroke distance) is preferably 2 mm or less, more preferably 1 mm or less, and yet more preferably 0.3 mm or less, from the viewpoint of applying the brazing material onto the metal member with high accuracy (application fineness).

The cross section of the discharge channel 12 in a plane perpendicular to the flow direction of the brazing material and/or the cross section in a plane parallel to the flow direction of the brazing material may vary, as described above. In a case in which the discharge channel 12 varies, the discharge channel 12 may be configured to be partitioned by first to third partition planes described below to include a plurality of partition channels. In such a case, the discharge channel 12 may be configured to include a second channel 12b, which is a partition channel having the outer opening 121, and a first channel 12a, which is a partition channel adjacent to the second channel 12b. In the discharge channel 12 which is constituted of the plurality of partition channels, it is preferable that the inner diameter of the discharge channel 12 be present at a middle portion (excluding the outer and inner openings of the discharge channel) in the flow direction of the brazing material in the discharge channel 12. In the discharge channel 12 which is constituted of the plurality of partition channels, the inner diameter of the discharge channel 12 is preferably present at a connection portion between the partition channels. The inner diameter of the discharge channel 12 is the smallest diameter of the first diameters described above. Therefore, in the discharge channel 12, a change in the discharge channel 12 occurs in a peripheral portion constituting the inner diameter (portion closest to the liquid chamber 11 in a case in which there are a plurality of portions constituting the inner diameter). The portion where the change in the discharge channel 12 occurs hinders the flow of the brazing material in the discharge channel 12, and the brazing material colliding with the inner surface of the discharge channel 12 receives a repulsive force from the wall surface, which can easily generate a turbulent flow in the brazing material. When the turbulent flow is generated, the droplet of the brazing material discharged from the discharge channel 12 is rotated, and the gyroscopic effect increases the straightness of the droplet of the brazing material. As a result, a required amount of the brazing material can be supplied in a minute range with higher accuracy.

The discharge channel 12 is partitioned into a plurality of partition channels by first to third partition planes identified in the following manner. Of the plurality of partition channels, a partition channel with the outer opening is designated as a second channel 12b, and a partition channel adjacent to the second channel 12b is designated as a first channel 12a. Note that, in a case in which the discharge channel 12 is constant in the flow direction of the brazing material, as illustrated in FIG. 1, the discharge channel 12 is not partitioned into the first and second channels.

(1) The first partition plane is the second reference plane that specifies the first diameter D, which is the inner diameter of the discharge channel 12. If there are multiple second reference planes, the second reference plane closest to the liquid chamber 11 is adopted. (2) The second partition plane is a plane that specifies a fault portion (a portion at which the value of the first diameter becomes discontinuous when the first diameter is measured continuously from the inner opening to the outer opening) in any cross section cut by a plane parallel to the flow direction of the brazing material in the discharge channel. (3) The third partition plane is a connection plane between components when the discharge channel 12 is constituted of multiple components.

Whether a portion 123 of the discharge channel 12, which corresponds to any of the first to third partition planes, constitutes the partition channel on the side of the liquid chamber 11 or the partition channel on the side of the outer opening 121 is determined on the basis of the following criteria. Supposing both a case in which the portion 123 of the discharge channel 12 corresponding to any of the first to third partition planes constitutes the partition channel on the side of the liquid chamber 11 and a case in which the portion 123 of the discharge channel 12 constitutes the discharge partition channel on the side of the outer opening 121. If there is a difference between the inner diameter of the partition channel on the side of the liquid chamber 11 and the inner diameter of the partition channel on the side of the outer opening 121, it is assumed that the portion 123 of the discharge channel 12 constitutes the partition channel with the smaller inner diameter. On the other hand, if there is no difference between the inner diameter of the partition channel on the side of the liquid chamber 11 and the inner diameter of the partition channel on the side of the outer opening 121, it is assumed that the portion 123 of the discharge channel 12 constitutes both the partition channel on the side of the liquid chamber 11 and the partition channel on the side of the outer opening 121 (the portion 123 is shared between the partition channel on the side of the liquid chamber 11 and the partition channel on the side of the outer opening 121). The inner diameter of the partition channel is a value measured in the same manner as the inner diameter of the discharge channel 12. Note that, in the above-described explanation, the same reference numerals as in FIGS. 2 to 5 are used for easy understanding, but the mode of partitioning the discharge channel 12 into multiple partition channels is not limited to the modes of the discharge channels illustrated in FIGS. 2 to 5.

In a case in which any of the first to third partition planes corresponds to an outer or inner opening end of the discharge channel 12, the discharge channel is not partitioned by the partition plane that corresponds to the outer or inner opening end of the discharge channel 12. In a case in which any of the partition planes corresponds to the inner opening end of the discharge channel 12, the brazing material is stored in the liquid chamber 11 before flowing into the discharge channel, and the brazing material cannot receive a sufficient repulsive force from the wall surface. In a case in which any of the partition planes corresponds to the outer opening end, even though a turbulent flow can be generated in the brazing material, it is not possible to impart sufficient rotation to the droplet of the brazing material after the brazing material passes through the outer opening end 121 of the discharge channel 12. In such a case, the straightness of the droplet of the brazing material cannot be improved by the gyroscopic effect.

Figure 2:
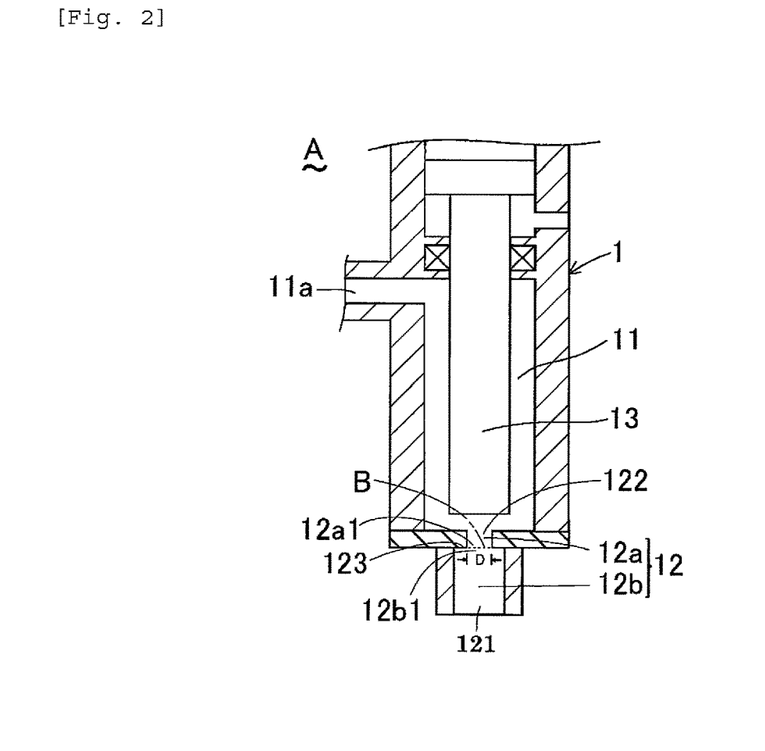
FIG. 2 is a schematic diagram illustrating another example of the discharge apparatus.
Figure 4:
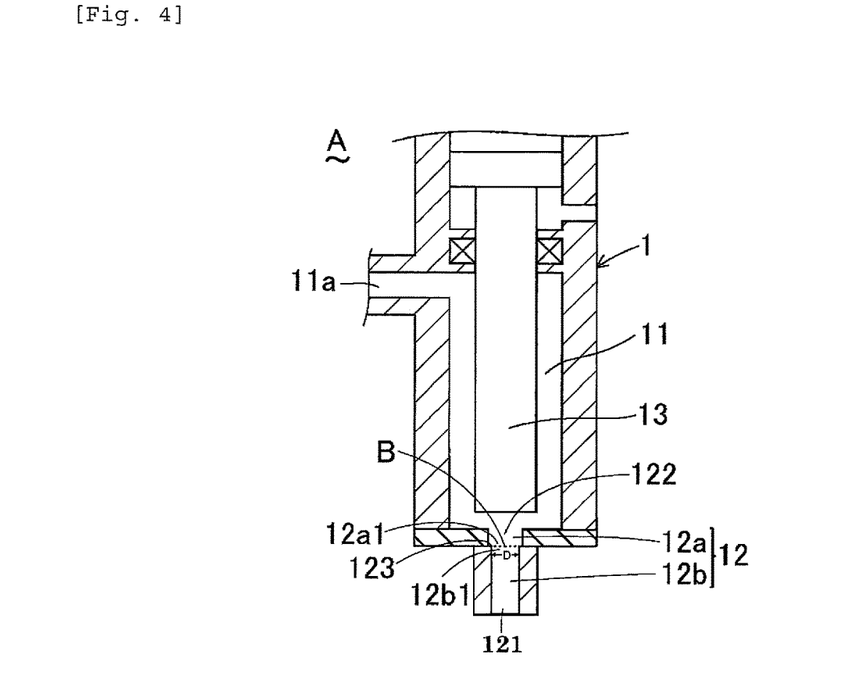
FIG. 4 is a schematic diagram illustrating yet another example of the discharge apparatus.
Figure 5:
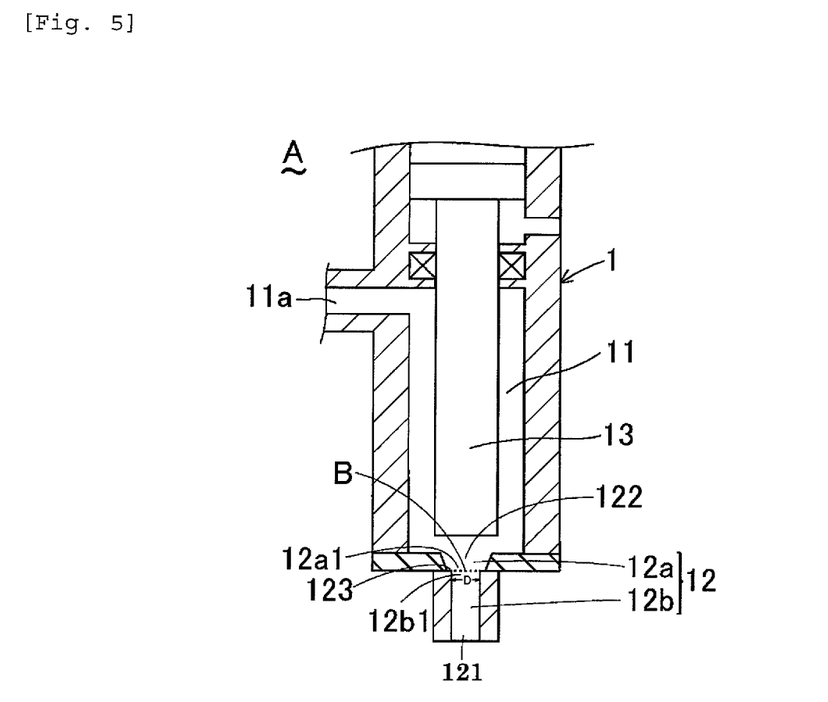
FIG. 5 is a schematic diagram illustrating yet another example of the discharge apparatus.

Specifically, in each of the discharge channels 12 in FIGS. 2, 4, and 5, the first to third partition planes B are common. Each of the discharge channels 12 is partitioned into two partition channels by the partition plane B. The partition channel with the outer opening 121 is designated as a second channel 12b, and the partition channel adjacent to the second channel 12b is designated as a first channel 12a.

Figure 3:
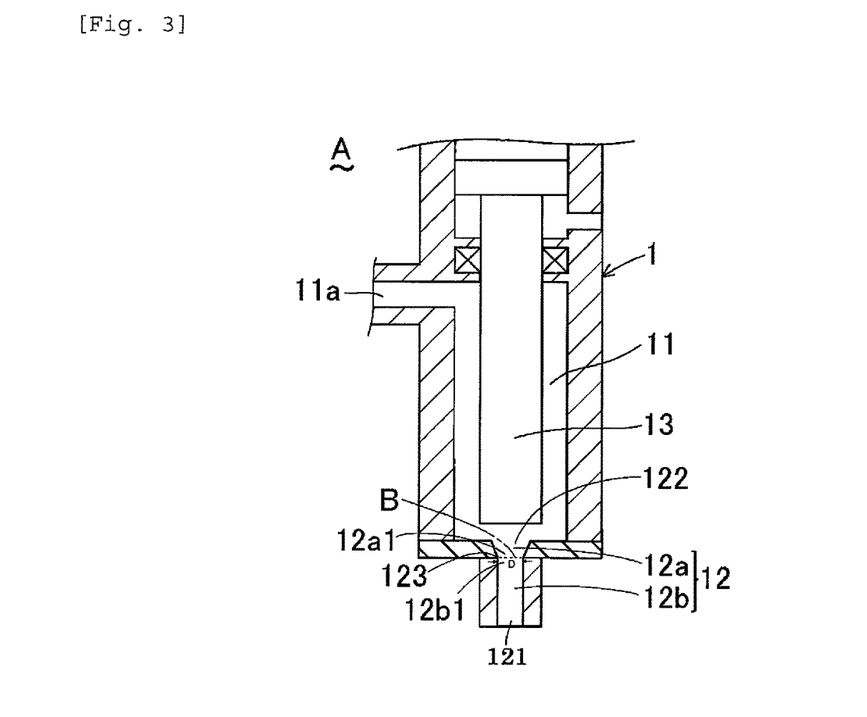
FIG. 3 is a schematic diagram illustrating yet another example of the discharge apparatus.

In a discharge channel 12 in FIG. 3, there is no second partition plane, and the first and third partition planes are common. The common first and third partition planes B partition the discharge channel 12 into two partition channels. The partition channel with the outer opening 121 is designated as a second channel 12b, and the partition channel adjacent to the second channel 12b is designated as a first channel 12a.

In FIG. 2, the first channel 12a is formed in the shape of a column. The cross section of the first channel 12a in a plane perpendicular to the flow direction of the brazing material may be constant or may vary. The first channel 12a is connected to, and communicates with, the liquid chamber 11 at the inner opening 122. The shape of the first channel 12a is not particularly limited. Examples of the shape of the first channel 12a include a prism such as a triangular prism and a quadrilateral prism, and a cylinder, and the cylinder is preferable. The first channel 12a may be formed in the shape of a truncated polygonal pyramid or a truncated circular cone. It is preferable that the first channel 12a be gradually tapered in the flow direction of the brazing material.

The second channel 12b is connected to, and communicates with, the first channel 12a. The inner diameter of the second channel 12b is configured to be larger than the inner diameter of the first channel 12a. An opening 12b1 of the second channel 12b on the side of the liquid chamber 11 is configured to completely cover an opening 12a1 of the first channel 12a on a discharge side. The second channel 12b is formed in the shape of a column. The cross section of the second channel 12b in a plane perpendicular to the flow direction of the brazing material may be constant or may vary. The shape of the second channel 12b is not particularly limited. Examples of the shape of the second channel 12b include a prism such as a triangular prism and a quadrilateral prism, and a cylinder, and the cylinder is preferable.

In FIG. 2, since the inner diameter of the second channel 12b is configured to be larger than the inner diameter of the first channel 12a, there is a portion of change in the discharge channel 12. However, in a case in which the first channel 12a is in the shape of a prism or a cylinder, it may not be possible to generate a turbulent flow in the brazing material. In a case in which the first channel 12a is in the shape of a truncated polygonal pyramid or a truncated circular cone and is tapered in the flow direction of the brazing material, a turbulent flow can be generated in the brazing material. However, the droplet of the brazing material may not be sufficiently rotated after passing through the outer opening end 121 of the discharge channel 12. The straightness of the droplet of the brazing material may not be effectively improved by the gyroscopic effect.

In FIG. 3, the first channel 12a is formed in the shape of a truncated polygonal pyramid or a truncated circular cone. The first channel 12a is gradually tapered in the flow direction of the brazing material. The first channel 12a is connected to, and communicates with, the liquid chamber 11 at the inner opening 122. The shape of the truncated pyramidal first channel 12a is not particularly limited. Examples of the shape of the truncated pyramidal first channel 12a include a truncated triangular pyramid, and a truncated quadrangular pyramid. The first channel 12a is preferably in the shape of a truncated circular cone.

The second channel 12b is connected to, and communicates with, the first channel 12a. The second channel 12b is formed in the shape of a column, and in the shape of projecting the opening of the first channel 12a on the discharge side in the flow direction of the brazing material. The second channel 12b preferably has a constant cross section in a plane perpendicular to the flow direction of the brazing material.

In the discharge channel 12 in FIG. 4, the first channel 12a is formed in the shape of a column. The cross section of the first channel 12a in a plane perpendicular to the flow direction of the brazing material may be constant or may vary. The first channel 12a is connected to, and communicates with, the liquid chamber 11 at the inner opening 122. The shape of the first channel 12a is not particularly limited. Examples of the shape of the first channel 12a include a prism such as a triangular prism and a quadrilateral prism, and a cylinder, and the cylinder is preferable. Note that the first channel 12a may be formed in the shape of a truncated polygonal pyramid or a truncated circular cone. It is preferable that the first channel 12a be gradually tapered in the flow direction of the brazing material.

The second channel 12b is connected to, and communicates with, the first channel 12a. The inner diameter of the second channel 12b is configured to be smaller than the inner diameter of the first channel 12a. An opening 12a1 of the first channel 12a on the discharge side is configured to completely cover an opening 12b1 of the second channel 12b on the side of the liquid chamber 11. The second channel 12b is formed in the shape of a column. The cross section of the second channel 12b in a plane perpendicular to the flow direction of the brazing material may be constant or may vary. The shape of the second channel 12b is not particularly limited. Examples of the shape of the second channel 12b include a prism such as a triangular prism and a quadrilateral prism, and a cylinder, and the cylinder is preferable.

In the discharge channel 12 in FIG. 5, the first channel 12a is formed in the shape of a truncated polygonal pyramid or a truncated circular cone. The first channel 12a is gradually tapered in the flow direction of the brazing material. Therefore, the wall surface of the truncated pyramidal or truncated conical first channel 12a becomes an obstacle to the flow of the brazing material, and the brazing material receives a repulsive force from the wall surface, which lead to generating a turbulent flow more effectively. The first channel 12a is connected to, and communicates with, the liquid chamber 11 at the inner opening 122. The shape of the truncated pyramidal first channel 12a is not particularly limited. Examples of the shape of the truncated pyramidal first channel 12a include a truncated triangular pyramid, and a truncated quadrilateral pyramid. The first channel 12a is preferably in the shape of a truncated circular cone.

The second channel 12b is configured to have a smaller inner diameter than the inner diameter of the first channel 12a. The opening 12a1 of the first channel 12a on the discharge side is configured to completely cover the opening 12b1 of the second channel 12b on the side of the liquid chamber 11. The second channel 12b is formed in the shape of a column. The cross section of the second channel 12b in a plane perpendicular to the flow direction of the brazing material may be constant or may vary. The shape of the second channel 12b is not particularly limited. Examples of the shape of the second channel 12b include a prism such as a triangular prism and a quadrilateral prism, and a cylinder, and the cylinder is preferable.

In the discharge channel 12, it is preferable to have a structure (reduced structure) in which the first diameter is reduced in the flow direction of the brazing material. When the discharge channel 12 has the reduced structure, a turbulent flow is generated while the brazing material is being flowed in the reduced structure of the discharge channel 12. When the turbulent flow is generated in the brazing material, rotation occurs in the droplet of the brazing material discharged from the discharge channel 12, and the straightness of the droplet of the brazing material increases by the gyroscopic effect. Therefore, a required amount of the brazing material can be supplied in a minute range with higher accuracy.

When the discharge channel 12 is constituted of the multiple partition channels, the droplet of the brazing material to be discharged from the discharge channel 12 is most affected when the brazing material is flowed through the partition channel (second channel 12b) with the outer opening and the first channel 12a adjacent to the second channel 12b. The ratio (inner diameter of the second channel/inner diameter of the first channel) between the inner diameter of the second channel 12b and the inner diameter of the first channel 12a is preferably less than 1, more preferably 0.8 or less, and yet more preferably 0.7 or less. When the ratio between the inner diameter of the second channel 12b and the inner diameter of the first channel 12a is less than 1, a turbulent flow is effectively generated in the brazing material, and rotation is imparted to the droplet of the brazing material. Therefore, the straightness of the droplet of the brazing material can increase by the gyroscopic effect. As a result, a required amount of the brazing material can be supplied in a minute range with higher accuracy.

The ratio (inner diameter of the second channel/inner diameter of the first channel) between the inner diameter of the second channel 12b and the inner diameter of the first channel 12a is preferably 0.35 or more, more preferably 0.40 or more, and yet more preferably 0.50 or more. When the ratio (inner diameter of the second channel/inner diameter of the first channel) between the inner diameter of the second channel 12b and the inner diameter of the first channel 12a is 0.35 or more, a turbulent flow can be effectively generated in the brazing material to impart rotation to the droplet of the brazing material. Therefore, the straightness of the droplet of the brazing material can increase by the gyroscopic effect.

In the liquid chamber 11, the plunger 13 may move forward in the direction close to the inner opening 122 of the discharge channel 12 until the plunger 13 comes into contact with the inner wall surface of the liquid chamber 11, as described above, or may stop moving forward before the plunger 13 comes into contact with the inner wall surface of the liquid chamber 11 and move backward in the direction away from the inner opening 122 of the discharge channel 12.

When the plunger 13 stops moving forward before the plunger 13 comes into contact with the inner wall surface of the liquid chamber 11, the distance (hereinafter also referred to as "clearance") between the tip of the plunger 13 and the inner opening of the discharge channel in the forward direction of the plunger 13 is preferably 1 mm or less, more preferably less than 1 mm, and yet more preferably 0.5 mm or less. The distance between the tip of the plunger 13 and the inner opening of the discharge channel being 1 mm or less can prevent leakage of the brazing material retained in the discharge channel by surface tension of the liquid brazing material filled in the outer opening of the discharge channel. Furthermore, when the brazing material leaks out of the discharge channel, organic components (a solidifying agent, an organic viscosity reducing agent, and the like) of the brazing material mainly leak out, and the concentration of the fluoride-based flux in the brazing material retained in the discharge channel becomes relatively high, which easily causes clogging of the discharge channel with the brazing material.

Next, a procedure for applying the brazing material to the metal member using the above-described discharge apparatus will be described. The brazing material to be applied to the metal member using the above-described discharge apparatus is not particularly limited, as long as the brazing material contains the fluoride-based flux. It is preferable that the brazing material contain the fluoride-based flux, and be solid at 1 atm (101.325 kPa) and 25° C.

According to the above-described brazing material application method, even in the case of using the brazing material that contains the fluoride-based flux powder and tends to cause clogging of the discharge channel 12, the brazing material can be discharged without causing clogging of the discharge channel 12 with the brazing material, and the brazing material can be accurately applied to the metal member. This is preferable because excellent effects of the above-described brazing material application method can be especially demonstrated.

The brazing material used in the brazing material application method is not particularly limited, but a brazing material containing a fluoride-based flux, a solidifying agent, and an organic viscosity reducing agent can be preferably used.

The fluoride-based flux is in solid form during the entire process of applying the brazing material to the metal member using the discharge apparatus. Examples of the fluoride-based flux include a Cs—Al—F flux, a K—Al—F flux (a potassium fluoride aluminate flux), and a K—Zn—F flux, and the K—Al—F flux is preferable. One type of the fluoride-based flux may be used alone, or two or more types of the fluoride-based fluxes may be used together.

The Cs—Al—F flux is a fluoride-based flux containing cesium (Cs), aluminum (Al), and fluorine (F), such as cesium fluoroaluminate (non-reactive cesium-based flux). Specifically, examples of the Cs—Al—F flux include $CsAlF_4$, $Cs_2AlF_5$, and $Cs_3AlF_6$.

The K—Al—F flux is a fluoride-based flux containing potassium (K), aluminum (Al), and fluorine (F), such as potassium fluoroaluminate. Specifically, examples of the K—Al—F flux include $KAlF_4$, $K_2AF_5$, and $K_3AlF_6$.

The K—Zn—F flux is a fluoride-based flux containing potassium (K), zinc (Zn) and fluorine (F), such as potassium fluorozincate. Specifically, examples of the K—Zn—F flux include $KZnF_3$.

The average particle diameter of the fluoride-based flux is preferably 90 μm or less, more preferably 49 μm or less, and yet more preferably 20 μm or less. The fluoride-based flux with the average particle diameter falling in the above-described range can effectively prevent clogging of the discharge channel of the discharge apparatus with the brazing material.

The content of the fluoride-based flux in the brazing material is preferably 1 mass % or more, more preferably 10 mass % or more, yet more preferably 20 mass % or more, and yet more preferably 30 mass % or more. The content of the fluoride-based flux in the brazing material is preferably 80 mass % or less, and more preferably 60 mass % or less.

The solidifying agent is included as a carrier for attaching the fluoride-based flux to the metal member. As the solidifying agent, a compound (hereinafter also referred to as "room temperature solid compound") that is solid at 1 atm and 25° C. is preferably used. Examples of the room temperature solid compound include hydrocarbons (for example, natural wax, synthetic wax, and the like), alkyl alcohols, ether alcohols, and esters.

Examples of the natural wax include petroleum wax, such as paraffin wax and microcrystalline wax. Examples of the synthetic wax include polyethylene wax and Fischer-Tropsch wax.

The content of the solidifying agent in the brazing material is preferably 5 mass % or more, more preferably 10 mass % or more, yet more preferably 30 mass % or more, and yet more preferably 50 mass % or more. The content of the solidifying agent in the brazing material is preferably 90 mass % or less, more preferably 80 mass % or less, and yet more preferably 70 mass % or less.

The organic viscosity reducing agent is an organic compound that improves the dispersibility of the fluoride-based flux in the brazing material. Examples of the organic viscosity modifying agent include surfactants and organic compounds with low melting points (excluding surfactants).

The content of the organic viscosity reducing agent in the brazing material is preferably 0.1 mass % or more, more preferably 0.2 mass % or more, yet more preferably 0.5 mass % or more, and yet more preferably 1.0 mass % or more. The content of the organic viscosity reducing agent in the brazing material is preferably 60 mass % or less, more preferably 55 mass % or less, and yet more preferably 50 mass % or less.

The brazing material can further contain a brazing powder, a Zn powder, or the like, as needed. Examples of the brazing powder include powders of metallic silicon, silicon-aluminum alloys, and alloys containing small amounts of magnesium, copper, or germanium in the metallic silicon or the silicon-aluminum alloys.

The viscosity of the brazing material at 95° C. is preferably 0.01 to 100 Pa·s, and more preferably 0.1 to 10 Pa·s. The viscosity of the brazing material at 95° C. refers to the viscosity of the brazing material that is heated to 95° C. and melted, and then is measured at a shear rate of 2/s using a rheometer, while being maintained at 95° C. Examples of the rheometer include an apparatus (jig: PP25, measurement position: 0.5 mm) that is commercially available from Anton Paar under the product name "physica MCR 301".

First, in a case in which the brazing material is solid in a normal state (not heated or cooled under 1 atm) before being supplied to the discharge apparatus, the brazing material is heated in the container using the second heating device (not illustrated) for liquefying (heating step), and the liquid brazing material is stored in the container. In a case in which the brazing material is liquid under an operating environment, the brazing material does not need to be heated.

Before supplying the liquid brazing material to the liquid chamber 11 of the discharge apparatus, it is preferable to supply the liquid brazing material to the stirrer as necessary to stir the liquid brazing material and maintain a uniform dispersion state of the fluoride-based flux in the brazing material (stirring step). The stirring step may be performed in the same container as the heating step, or in a different container.

The drive device is activated to retreat the plunger 13 in the liquid chamber 11 of the discharge apparatus to a state in which the plunger 13 is separated from the inner opening 122 of the discharge channel 12 in the liquid chamber 11 to form a space for filling the liquid brazing material in the liquid chamber 11.

Next, the liquid brazing material is supplied and filled into the liquid chamber 11 of the discharge apparatus through the inlet port 11a (supply step).

Then, the drive device is operated to push the plunger 13 in the liquid chamber 11 toward the inner opening 122 of the discharge channel 12 to extrude the brazing material filled in the liquid chamber 11 to the inner opening 122 of the discharge channel 12, so that the brazing material in the form of a droplet is discharged from the outer opening of the discharge channel 12 toward the metal member and applied to the surface of the metal member (application step). The brazing material applied to the surface of the metal member is cooled and solidified, and thus, a coating of the brazing material is formed on the metal member to produce a metal member for brazing. Note that the metal member is not particularly limited, as long as the metal member is a member made of metal to be joined and integrated with each other by welding. Examples of the metal member include members containing aluminum or an aluminum alloy. The metal member may be processed into various shapes as necessary. The brazing material application method of the present invention is suitably applied to the metal member of any shape, irrespective of the shape of the metal member.

Since the discharge apparatus satisfies the formula 1 above, a desired amount of the brazing material can be supplied and applied to the metal member in the form of a droplet without causing clogging of the discharge channel of the discharge apparatus with the brazing material.

After the brazing material in the liquid chamber 11 is discharged through the discharge channel 12, the plunger 13 moves in the liquid chamber 11 in a direction away from the inner opening 122 of the discharge channel 12 to be retreated, and forms a space for filling the liquid brazing material in the liquid chamber 11. After that, the liquid brazing material is supplied into the liquid chamber 11 in the same manner as described above, and the same steps as described above are carried out, and the brazing material in the liquid chamber 11 is discharged and applied to the metal member through the discharge channel 12 to manufacture the metal member for brazing.

In this way, the discharge apparatus discharges and applies the brazing material intermittently in the form of droplets to the metal members, while preventing clogging of the discharge channel caused by the brazing material. Therefore, it is possible to perform brazing material application operation to the metal members over a long period of time and stably manufacture the metal members for brazing.

In a case in which the discharge apparatus satisfies the formula 2, a necessary and sufficient amount of the brazing material can be accurately supplied and applied to a desired part of the metal member in a minute range. Therefore, welding portions of the metal members for brazing can be made thinner and lighter, and completed products such as machines manufactured using the metal members for brazing can be made lighter and smaller.

EXAMPLES

The present invention will be hereinafter described in more detail with examples, but is not limited in any way to these examples.

The compounds used in the examples and comparative examples are listed below.

[Fluoride-Based flux]
　　Potassium fluoride aluminate flux (average particle diameter: 5 μm, product name "FL-7" manufactured by Morita Chemical Industries Co. Ltd.)
　　Potassium fluoride aluminate flux (average particle diameter: 15 μm, product name "Nocolok Flux" manufactured by Solvay)
　　Potassium fluoride aluminate flux (average particle diameter: 25 μm, product name "Nocolok Flux Drystatic" manufactured by Solvay)
　　Potassium fluoride aluminate flux (average particle diameter: 50 μm)
　　Potassium fluoride aluminate flux (product name "Nocolok Flux" manufactured by Solvay) was heated to 567° C. and melted, and then cooled. The obtained powder was classified using a centrifugal separator (product name "TC-30" manufactured by NISSHIN ENGINEERING INC.), and potassium fluoride aluminate flux with an average particle diameter of 50 μm was obtained.
　　Potassium fluoride aluminate flux (average particle diameter: 100 μm)
　　Potassium fluoride aluminate flux (product name "Nocolok Flux" from Solvay) was heated to 567° C. and melted, and then cooled. The obtained powder was classified using a centrifugal separator (product name "TC-30" manufactured by NISSHIN ENGINEERING INC.), and potassium fluoride aluminate flux with an average particle diameter of 100 μm was obtained.

[Solidifying Agent]
　　Paraffin wax (product name "PW-115" manufactured by NIPPON SEIRO CO., LTD.)

[Organic Viscosity Modifying Agent]
　　Surfactant (laurylamine acetate, product name "Acetamin" manufactured by Kao Corporation)

Examples 1 to 15, Comparative Examples 1 to 3

Forty-five parts by mass of a potassium fluoride aluminate flux having average particle diameters listed in Table 1, 52 parts by mass of paraffin wax, and 3.0 parts by mass of a surfactant were heated to 90° C., mixed uniformly, and then cooled to produce brazing materials. The obtained brazing materials were solid at 1 atm and 25° C. The viscosity of the brazing materials at 95° C. is listed in Table 1.

The brazing materials were applied to surfaces of aluminum metal members using the discharge apparatus illustrated in FIG. 1. Specifically, each of the above-described brazing materials was supplied into a container (not illustrated) and heated to 95° C. using the second heating device (not illustrated) for liquefying (heating step). The liquid brazing material in the container was stirred using the stirrer while being maintained at 95° C. (stirring step), so that the potassium fluoride aluminate flux was uniformly dispersed in the brazing material.

Next, the drive device (not illustrated) was operated to retreat the plunger 13 in the liquid chamber 11 of the discharge apparatus A to a state in which the plunger 13 was separated from the inner opening 122 of the discharge channel 12 in the liquid chamber 11 to form a space for filling the liquid brazing material in the liquid chamber 11. Note that the apparatus body 1 (the inner wall of the liquid chamber 11 and the inner peripheral surface of the discharge channel 12) of the discharge apparatus A was heated by the first heating device (not illustrated) set at 95° C.

After that, the liquid brazing material was supplied and filled into the liquid chamber 11 of the discharge apparatus through the inlet port 11a (supply step). At this time, a liquid feed pressure of 500 kPa was constantly applied to the brazing material in the container. Subsequently, the drive device was operated to push the plunger 13 in the liquid chamber 11 toward the inner opening 122 of the discharge channel 12 until the plunger 13 came into contact with the inner wall surface of the liquid chamber 11, and the liquid brazing material filled in the liquid chamber 11 was extruded to the inner opening 122 of the discharge channel 12. The brazing material was discharged from the outer opening 121 of the discharge channel 12 in the form of a droplet to the metal member, so that the brazing material was applied to the surface of the aluminum metal member (application step). The liquid brazing material was flowed in a straight line in the discharge channel 12. The brazing material in the form of the droplet applied to the surface of the metal member was cooled and solidified in a short time, so that a coating of the brazing material was formed on the surface of the metal member.

The cross-sectional shape of the discharge channel 12 in a plane perpendicular to the flow direction of the brazing material was a perfect circle. The cross section of the discharge channel in a plane perpendicular to the flow direction of the brazing material was the same in the entire length in the flow direction of the brazing material. All cross sections of the discharge channel in any of planes parallel to the flow direction of the brazing material were quadrilateral in shape. In the discharge apparatus, the inner diameter of the discharge channel 12 is as listed in Table 1. The travel distance of the plunger 13 in the forward and backward movement directions (stroke distance) in the above-described application step is listed in Table 1.

Next, after the brazing material in the liquid chamber 11 was discharged through the discharge channel 12, the plunger 13 was moved and retreated in the liquid chamber 11 in the direction away from the inner opening 122 of the discharge channel 12, to form a space for filling the liquid brazing material in the liquid chamber 11.

The time from the state in which the plunger 13 was moved forward the most (a state of touching the inner wall surface of the liquid chamber 11) to the state in which, after the plunger 13 was moved away from the inner opening 122 of the discharge channel 12 and completely retreated, the plunger 13 was started to be moved forward toward the inner opening 122 of the discharge channel 12 again was 2 msec.

It was adjusted such that the metal member was moved relative to the outer opening 121 of the discharge channel 12 of the discharge apparatus and the liquid brazing material was discharged at a different location on the metal member.

After that, the liquid brazing material was supplied into the liquid chamber 11 in the same manner as described above (supply step), and the liquid brazing material in the liquid chamber 11 was discharged in the form of a droplet onto the metal member through the discharge channel 12 to apply the brazing material to the surface of the metal member (application step). The droplet of the brazing material applied to the surface of the metal member was cooled and solidified, so that the metal member for brazing with a coating of the brazing material formed on the surface of the metal member was obtained.

By repeatedly performing the above-described supply and application steps, the brazing material was applied to multiple locations on the surface of the metal member in a speckled pattern. The brazing material was discharged in the form of droplets from the outer opening 121 of the discharge channel 12 at time intervals of 10 msec.

Examples 16 to 41

Forty-five parts by mass of a potassium fluoride aluminate flux having the average particle diameters listed in Tables 2 and 3, 52 parts by mass of paraffin wax, and 3.0 parts by mass of a surfactant were heated to 90° C., mixed uniformly, and then cooled to produce brazing materials. The obtained brazing materials were solid at 1 atm and 25° C. The viscosity of the brazing materials at 95° C. is listed in Tables 2 and 3.

The brazing materials were applied to surfaces of aluminum metal members using any of the discharge apparatuses illustrated in FIGS. 2 to 5. Tables 2 and 3 list the numbers of drawings of the used discharge apparatuses. Specifically, each of the above-described brazing materials was supplied into a container (not illustrated) and heated to 95° C. using the second heating device (not illustrated) for liquefying (heating step). The liquid brazing material in the container was stirred using the stirrer while being maintained at 95° C. (stirring step), so that the potassium fluoride aluminate flux was uniformly dispersed in the brazing material.

Next, the drive device (not illustrated) was operated to retreat the plunger 13 in the liquid chamber 11 of the discharge apparatus A to a state in which the plunger 13 was separated from the inner opening 122 of the discharge channel 12 in the liquid chamber 11 to form a space for filling the liquid brazing material in the liquid chamber 11. Note that the apparatus body 1 (the inner wall of the liquid chamber 11 and the inner peripheral surface of the discharge channel 12) of the discharge apparatus A was heated by the first heating device (not illustrated) set at 95° C.

After that, the liquid brazing material was supplied and filled into the liquid chamber 11 of the discharge apparatus through the inlet port 11a (supply step). At this time, a liquid feed pressure of 500 kPa was constantly applied to the brazing material in the container. Subsequently, the drive device was operated to push the plunger 13 in the liquid chamber 11 toward the inner opening 122 of the discharge channel 12, and the liquid brazing material filled in the liquid chamber 11 was extruded to the inner opening 122 of the discharge channel 12. The brazing material was discharged from the outer opening 121 of the discharge channel 12 in the form of a droplet to the metal member so that the brazing material was applied to the surface of the aluminum metal member (application step). The distance (clearance) between the tip of the plunger 13 and the inner opening 122 of the discharge channel is listed in Tables 2 and 3. Note that, in a case in which the plunger 13 is in contact with the inner wall surface of the liquid chamber 11, the clearance is defined as 0 mm. The brazing material in the form of the droplet applied to the surface of the metal member was cooled and solidified in a short time, so that a coating of the brazing material was formed on the surface of the metal member. The travel distance of the plunger 13 in the forward and backward movement directions (stroke distance) in the above-described application step is listed in Tables 2 and 3.

Next, after the brazing material in the liquid chamber 11 was discharged through the discharge channel 12, the plunger 13 was moved and retreated in the liquid chamber 11 in the direction away from the inner opening 122 of the discharge channel 12, to form a space for filling the liquid brazing material in the liquid chamber 11.

The time from the state in which the plunger 13 was moved forward the most to the state in which, after the plunger 13 was moved away from the inner opening 122 of the discharge channel 12 and completely retreated, the plunger 13 was started to be moved forward toward the inner opening 122 of the discharge channel 12 again was 2 msec.

It was adjusted such that the metal member was moved relative to the outer opening 121 of the discharge channel 12 of the discharge apparatus and the liquid brazing material was discharged at a different location on the metal member.

After that, the liquid brazing material was supplied into the liquid chamber 11 in the same manner as described above (supply step), and the liquid brazing material in the liquid chamber 11 was discharged in the form of a droplet onto the metal member through the discharge channel 12 to apply the brazing material to the surface of the metal member (application step). The droplet of the brazing material applied to the surface of the metal member was cooled and solidified, so that the metal member for brazing with a coating of the brazing material formed on the surface of the metal member was obtained.

By repeatedly performing the above-described supply and application steps, the brazing material was applied to multiple locations on the surface of the metal member in a speckled pattern. The brazing material was discharged in the form of droplets from the outer opening 121 of the discharge channel 12 at time intervals of 10 msec.

The discharge channels 12 of the discharge apparatuses in FIGS. 2 to 5 were each constituted of the first channel 12a and the second channel 12b that was connected to, and communicated with, the first channel. The first channel 12a was connected to, and communicated with, the liquid chamber 11 at the inner opening 122. The inner diameters of the first channel 12a and the second channel 12b are listed in Tables 2 and 3. The discharge channels 12 of the discharge apparatuses illustrated in FIGS. 2 to 5 were configured as follows.

The discharge channel 12 illustrated in FIG. 2 was constituted of the first channel 12a and the second channel 12b that was connected to, and communicated with, the first channel. The opening 12b1 of the second channel 12b on the side of the liquid chamber 11 was configured to completely cover the opening 12a1 of the first channel 12a on the discharge side.

The first channel 12a was formed in the shape of a cylinder. The cross-sectional shape of the first channel 12a in a plane perpendicular to the flow direction of the brazing material was a perfect circle. The cross section of the first channel 12a in a plane perpendicular to the flow direction of the brazing material was the same in the entire length in the flow direction of the brazing material. All cross sections of the first channel 12a in any plane parallel to the flow direction of the brazing material were rectangular in shape.

The second channel 12b was formed in the shape of a cylinder. The cross-sectional shape of the second channel 12b in a plane perpendicular to the flow direction of the brazing material was a perfect circle. The cross section of the second channel 12b in a plane perpendicular to the flow direction of the brazing material was the same in the entire length in the flow direction of the brazing material. All cross sections of the second channel 2b in any plane parallel to the flow direction of the brazing material were rectangular in shape.

The discharge channel 12 illustrated in FIG. 3 was constituted of the first channel 12a and the second channel 12b that was connected to, and communicated with, the first channel. The opening 12b1 of the second channel 12b on the side of the liquid chamber 11 and the opening 12a1 of the first channel 12a on the discharge side were configured to be the same size and shape.

The first channel 12a was formed in the shape of a truncated circular cone. The first channel 12a was formed to be gradually tapered in the flow direction of the brazing material. The cross-sectional shape of the first channel 12a in a plane perpendicular to the flow direction of the brazing material was a perfect circle. All cross sections of the first channel 12a in any plane parallel to the flow direction of the brazing material were trapezoidal in shape.

The second channel 12b was formed in the shape of a cylinder. The second channel 12b was formed in the shape of projecting the opening 12a1 of the first channel 12a on the discharge side in the flow direction of the brazing material. The cross section of the second channel 12b in a plane perpendicular to the flow direction of the brazing material was a perfect circle with a constant diameter. The cross section of the second channel 12b in a plane parallel to the flow direction of the brazing material was rectangular in shape.

The discharge channel 12 illustrated in FIG. 4 was constituted of the first channel 12a and the second channel 12b that was connected to, and communicated with, the first channel. The inner diameter of the second channel 12b was formed smaller than the inner diameter of the first channel 12a. The opening 12a1 of the first channel 12a on the discharge side was configured to cover the entire opening 12b1 of the second channel 12b on the side of the liquid chamber 11.

The first channel 12a was formed in the shape of a cylinder. The cross-sectional shape of the first channel 12a in a plane perpendicular to the flow direction of the brazing material was a perfect circle. The cross section of the first channel 12a in a plane perpendicular to the flow direction of the brazing material was the same in the entire length in the flow direction of the brazing material. All cross sections of the first channel 12a in any plane parallel to the flow direction of the brazing material were rectangular in shape.

The second channel 12b was formed in the shape of a cylinder. The cross-sectional shape of the second channel 12b in a plane perpendicular to the flow direction of the brazing material was a perfect circle. The cross section of the second channel 12b in a plane perpendicular to the flow direction of the brazing material was the same in the entire length in the flow direction of the brazing material. All cross sections of the second channel 12b in any plane parallel to the flow direction of the brazing material were rectangular in shape.

The discharge channel 12 illustrated in FIG. 5 is constituted of the first channel 12a and the second channel 12b that was connected to, and communicated with, the first channel. The inner diameter of the second channel 12b was formed smaller than the inner diameter of the first channel 12a. The opening 12a1 of the first channel 12a on the discharge side was configured to cover the entire opening 12b1 of the second channel 12b on the side of the liquid chamber 11.

The first channel 12a was formed in the shape of a truncated circular cone. The first channel 12a was formed to be gradually tapered in the flow direction of brazing material. The cross-sectional shape of the first channel 12a in a plane perpendicular to the flow direction of the brazing material was a perfect circle. All cross sections of the first channel 12a in any plane parallel to the flow direction of the brazing material were trapezoidal in shape.

The second channel 12b was formed in the shape of a cylinder. The cross-sectional shape of the second channel 12b in a plane perpendicular to the flow direction of the brazing material was a perfect circle. The cross section of the second channel 12b in a plane perpendicular to the flow direction of the brazing material was the same in the entire length in the flow direction of the brazing material. All cross sections of the second channel 12b in any plane parallel to the flow direction of the brazing material were rectangular in shape.

The presence or absence of clogging was measured in the following manner during application operation of the brazing material to the metal member using the discharge apparatus. In addition, application fineness was measured in the following manner.

(Presence or Absence of Clogging)

"A" designates a case in which no clogging by the brazing material occurred in the discharge channel for more than three hours after the application of the brazing material to the metal members was started using the discharge apparatus. On the other hand, "B" designates a case in which clogging by the brazing material in the discharge channel occurred within three hours after the application of the brazing material to the metal members was started.

(Application Fineness)

The brazing material was applied once to the surface of the aluminum metal member in the same manner as in the examples and comparative examples, except that the liquid feed pressure applied to the brazing material was set to 30 kPa. The longest diameter of a spot of the brazing material on the metal member was measured. The longest diameter of the spot of the brazing material was the diameter of a perfect circle with a smallest diameter that could enclose the spot.

In any of the comparative examples, the brazing material could not be discharged, so that the application fineness could not be measured.

In a case in which the brazing material applied on the metal member forms multiple spots, only the spots with a longest diameter of 100 μm or more were studied. The diameter of a perfect circle with a smallest diameter that could enclose all the spots was measured.

(Leakage of Brazing Material)

The brazing material was applied to the metal members for 1 minute in the same manner as in the examples and the comparative examples, except that the liquid feed pressure applied to the brazing material was set to 30 kPa. After that, the liquid feed pressure applied to the brazing material was set to 0 kPa, and the discharge apparatus was allowed to stand still for 1 hour. The total amount of the brazing material that leaked from the outer opening of the discharge channel during this period was measured. "A" indicates a case in which the total amount of the brazing material was less than 0.1 g, and "B" indicates a case in which the total amount of the brazing material was 0.1 g or more.

TABLE 1

| | | Example | | | | | | | | | |
|---|---|---|---|---|---|---|---|---|---|---|---|
| | | 1 | 2 | 3 | 4 | 5 | 6 | 7 | 8 | 9 | |
| Application Conditions | Discharge Apparatus (Number of Drawing) | 1 | 1 | 1 | t | 1 | 1 | 1 | 1 | 1 | |
| | Viscosity of Brazing Material (Pa · s) | 1.3 | 0.2 | 0.05 | 1.3 | 1.3 | 1.3 | 1.3 | 0.08 | 0.08 | |
| | Average Particle Diameter of Fluoride-Based Flux (μm) | 5 | 15 | 50 | 5 | 5 | 5 | 5 | 25 | 25 | |
| | Inner Diameter of Discharge Channel (mm) | 0.29 | 0.29 | 0.29 | 0.76 | 0.76 | 0.76 | 0.29 | 0.29 | 0.29 | |
| | Stroke Distance (mm) | 0.3 | 0.3 | 0.3 | 0.3 | 0.1 | 0.05 | 0.1 | 0.1 | 0.05 | |
| | Value of Left Side of Formula 1 | 16.82 | 5.61 | 1.68 | 115.52 | 115.52 | 115.52 | 16.82 | 3.36 | 3.36 | |
| | Value of Left Side of Formula 2 | 126.2 | 378.5 | 1261.5 | 866.4 | 288.8 | 144.4 | 42.1 | 210.3 | 105.1 | |
| | Clearance (mm) | 0 | 0 | 0 | 0 | 0 | 0 | 0 | 0 | 0 | |
| Evaluation Results | Clogging | A | A | A | A | A | A | A | A | A | |
| | Application Fineness (mm) | 11 | 65 | 115 | 103 | 23 | 12 | 8 | 17 | 10 | |
| | Leakage of Brazing Material | A | A | A | A | A | A | A | A | A | |

| | | Example | | | | | | Comparative Example | | |
|---|---|---|---|---|---|---|---|---|---|---|
| | | 10 | 11 | 12 | 13 | 14 | 15 | 1 | 2 | 3 |
| Application Conditions | Discharge Apparatus (Number of Drawing) | 1 | 1 | 1 | 1 | 1 | 1 | 1 | 1 | 1 |
| | Viscosity of Brazing Material (Pa · s) | 1.3 | 1.3 | 1.3 | 1.3 | 1.3 | 1.3 | 0.05 | 0.2 | 1.3 |
| | Average Particle Diameter of Fluoride-Based Flux (μm) | 5 | 5 | 5 | 5 | 5 | 5 | 100 | 15 | 5 |
| | Inner Diameter of Discharge Channel (mm) | 0.29 | 0.29 | 0.11 | 0.11 | 0.11 | 0.11 | 0.29 | 0.11 | 0.05 |
| | Stroke Distance (mm) | 0.05 | 0.02 | 0.3 | 0.1 | 0.05 | 0.03 | 0.3 | 0.3 | 0.3 |
| | Value of Left Side of Formula 1 | 16.82 | 16.82 | 2.42 | 2.42 | 2.42 | 2.42 | 0.84 | 0.81 | 0.50 |
| | Value of Left Side of Formula 2 | 21.0 | 8.4 | 18.2 | 6.1 | 3.0 | 1.8 | 2523.0 | 54.5 | 3.8 |
| | Clearance (mm) | 0 | 0 | 0 | 0 | 0 | 0 | 0 | 0 | 0 |
| Evaluation Results | Clogging | A | A | A | A | A | A | B | B | B |
| | Application Fineness (mm) | 3 | 1.4 | 3.7 | 1 | 0.8 | 0.4 | — | — | — |
| | Leakage of Brazing Material | A | A | A | A | A | A | A | A | A |

TABLE 2

|  |  | Example |  |  |  |  |  |  |  |
|---|---|---|---|---|---|---|---|---|---|
|  |  | 16 | 17 | 18 | 19 | 20 | 21 | 22 | 23 |
| Application Conditions | Discharge Apparatus (Number of Drawing) | 2 | 2 | 2 | 2 | 2 | 2 | 2 | 2 |
|  | Viscosity of Brazing Material (Pa · s) | 1.3 | 0.2 | 0.05 | 1.3 | 1.3 | 1.3 | 1.3 | 0.08 |
|  | Average Particle Diameter of Fluoride-Based Flux (μm) | 5 | 15 | 50 | 5 | 5 | 5 | 5 | 25 |
|  | Inner Diameter of Discharge Channel (mm) | 0.29 | 0.29 | 0.29 | 0.76 | 0.76 | 0.76 | 0.29 | 0.29 |
|  | Inner Diameter of First Channel (mm) | 0.29 | 0.29 | 0.29 | 0.76 | 0.76 | 0.76 | 0.29 | 0.29 |
|  | Inner Diameter of Second Channel (mm) | 1.21 | 1.21 | 1.21 | 1.21 | 1.21 | 1.21 | 1.21 | 1.21 |
|  | Inner Diameter of Second Channel/ Inner Diameter of First Channel | 4.17 | 4.17 | 4.17 | 1.59 | 1.59 | 1.59 | 4.17 | 4.17 |
|  | Stroke Distance (mm) | 0.3 | 0.3 | 0.3 | 0.3 | 0.1 | 0.05 | 0.1 | 0.1 |
|  | Value of Left Side of Formula 1 | 16.82 | 5.61 | 1.68 | 115.52 | 115.52 | 115.52 | 16.82 | 3.36 |
|  | Value of Left Side of Formula 2 | 126.2 | 378.5 | 1261.5 | 866.4 | 288.8 | 144.4 | 42.1 | 210.3 |
|  | Clearance (mm) | 0 | 0 | 0 | 0 | 0 | 0 | 0 | 0 |
| Evaluation Results | Clogging | A | A | A | A | A | A | A | A |
|  | Application Fineness (mm) | 11 | 65 | 115 | 103 | 23 | 12 | 8 | 17 |
|  | Leakage of Brazing Material | A | A | A | A | A | A | A | A |

|  |  | Example |  |  |  |  |  |  |
|---|---|---|---|---|---|---|---|---|
|  |  | 24 | 25 | 26 | 27 | 28 | 29 | 30 |
| Application Conditions | Discharge Apparatus (Number of Drawing) | 2 | 2 | 2 | 2 | 2 | 2 | 2 |
|  | Viscosity of Brazing Material (Pa · s) | 0.08 | 1.3 | 1.3 | 1.3 | 1.3 | 1.3 | 1.3 |
|  | Average Particle Diameter of Fluoride-Based Flux (μm) | 25 | 5 | 5 | 5 | 5 | 5 | 5 |
|  | Inner Diameter of Discharge Channel (mm) | 0.29 | 0.29 | 0.29 | 0.11 | 0.11 | 0.11 | 0.11 |
|  | Inner Diameter of First Channel (mm) | 0.29 | 0.29 | 0.29 | 0.11 | 0.11 | 0.11 | 0.11 |
|  | Inner Diameter of Second Channel (mm) | 1.21 | 1.21 | 1.21 | 1.21 | 1.21 | 1.21 | 1.21 |
|  | Inner Diameter of Second Channel/ Inner Diameter of First Channel | 4.17 | 4.17 | 4.17 | 11.00 | 11.00 | 11.00 | 11.00 |
|  | Stroke Distance (mm) | 0.05 | 0.05 | 0.02 | 0.3 | 0.1 | 0.05 | 0.03 |
|  | Value of Left Side of Formula 1 | 3.36 | 16.82 | 16.82 | 2.42 | 2.42 | 2.42 | 2.42 |
|  | Value of Left Side of Formula 2 | 105.1 | 21.0 | 8.4 | 18.2 | 6.1 | 3.0 | 1.8 |
|  | Clearance (mm) | 0 | 0 | 0 | 0 | 0 | 0 | 0 |
| Evaluation Results | Clogging | A | A | A | A | A | A | A |
|  | Application Fineness (mm) | 10 | 3 | 1.4 | 3.7 | 1 | 0.8 | 0.4 |
|  | Leakage of Brazing Material | A | A | A | A | A | A | A |

|  |  | Example |  |  |  |  |  |
|---|---|---|---|---|---|---|---|
|  |  | 31 | 32 | 33 | 34 | 35 | 36 |
| Application Conditions | Discharge Apparatus (Number of Drawing) | 2 | 2 | 2 | 2 | 2 | 2 |
|  | Viscosity of Brazing Material (Pa · s) | 1.3 | 1.3 | 1.3 | 1.3 | 1.3 | 1.3 |
|  | Average Particle Diameter of Fluoride-Based Flux (μm) | 5 | 5 | 5 | 5 | 5 | 5 |
|  | Inner Diameter of Discharge Channel (mm) | 0.29 | 0.29 | 0.29 | 0.11 | 0.11 | 0.11 |
|  | Inner Diameter of First Channel (mm) | 0.29 | 0.29 | 0.29 | 0.11 | 0.11 | 0.11 |
|  | Inner Diameter of Second Channel (mm) | 1.21 | 1.21 | 1.21 | 1.21 | 1.21 | 1.21 |
|  | Inner Diameter of Second Channel/ Inner Diameter of First Channel | 4.17 | 4.17 | 4.17 | 11.00 | 11.00 | 11.00 |
|  | Stroke Distance (mm) | 0.1 | 0.1 | 0.1 | 0.3 | 0.3 | 0.3 |
|  | Value of Left Side of Formula 1 | 16.82 | 16.82 | 16.82 | 2.42 | 2.42 | 2.42 |
|  | Value of Left Side of Formula 2 | 42.1 | 42.1 | 42.1 | 18.2 | 18.2 | 18.2 |
|  | Clearance (mm) | 1 | 0.5 | 0.3 | 1 | 0.5 | 0.3 |
| Evaluation Results | Clogging | A | A | A | A | A | A |
|  | Application Fineness (mm) | 8 | 8 | 8 | 3.7 | 3.7 | 3.7 |
|  | Leakage of Brazing Material | B | A | A | B | A | A |

|  |  | Example |  |  |  |  |
|---|---|---|---|---|---|---|
|  |  | 37 | 38 | 39 | 40 | 41 |
| Application Conditions | Discharge Apparatus (Number of Drawing) | 4 | 4 | 5 | 3 | 4 |
|  | Viscosity of Brazing Material (Pa · s) | 1.3 | 1.3 | 1.3 | 1.3 | 1.3 |
|  | Average Particle Diameter of Fluoride-Based Flux (μm) | 5 | 5 | 5 | 5 | 5 |
|  | Inner Diameter of Discharge Channel (mm) | 0.29 | 0.29 | 0.29 | 0.29 | 0.29 |
|  | Inner Diameter of First Channel (mm) | 0.40 | 0.49 | 0.49 | 0.29 | 0.76 |

-continued

| | | | | | | |
|---|---|---|---|---|---|---|
| | Inner Diameter of Second Channel (mm) | 0.29 | 0.29 | 0.29 | 0.29 | 0.29 |
| | Inner Diameter of Second Channel/Inner Diameter of First Channel | 0.73 | 0.59 | 0.59 | 1.00 | 0.38 |
| | Stroke Distance (mm) | 0.1 | 0.1 | 0.1 | 0.1 | 0.1 |
| | Value of Left Side of Formula 1 | 16.82 | 16.82 | 16.82 | 16.82 | 16.82 |
| | Value of Left Side of Formula 2 | 42.1 | 42.1 | 42.1 | 42.1 | 42.1 |
| | Clearance (mm) | 0 | 0 | 0 | 0 | 0 |
| Evaluation Results | Clogging | A | A | A | A | A |
| | Application Fineness (mm) | 7 | 6 | 5 | 7 | 8 |
| | Leakage of Brazing Material | A | A | A | A | A |

CROSS-REFERENCE TO RELATED APPLICATION

The present application claims the priority under Japanese Patent Application No. 2019-239170, filed on Dec. 27, 2019, the disclosure of which is hereby incorporated in its entirety by reference.

INDUSTRIAL APPLICABILITY

The brazing material application method of the present invention allows the brazing material containing the fluoride-based flux powder to be discharged from the discharge channel without causing clogging, and the brazing material to be applied to the metal members stably over a long period of time, which leads to stably forming the coating of the brazing material on the metal member.

REFERENCE SIGNS LIST

1 apparatus body
11 liquid chamber
11a inlet port
12 discharge channel
12a first channel
12b second channel
13 plunger
121 outer opening
122 inner opening
A discharge apparatus

The invention claimed is:

1. A brazing material application method comprising:
a supply step of supplying a liquid brazing material containing a fluoride-based flux to a liquid chamber of a discharge apparatus that is configured to have the liquid chamber having a discharge channel, a plunger disposed in the liquid chamber movably forward and backward, and a drive device for moving the plunger forward and backward and to satisfy the formula 1; and
an application step of discharging the brazing material in the liquid chamber from the discharge channel by moving the plunger toward the discharge channel of the liquid chamber by the drive device such that droplets of the brazing material are discharged from the discharge channel, and applying the droplets of the brazing material to a metal member, wherein

[inner diameter (mm) of discharge channel]$^2 \times 1000/$(average particle diameter (μm) of fluoride-based flux)>0.85    Formula 1, and wherein the inner diameter of the discharge channel, a travel distance of the plunger in forward and backward movement directions, and the average particle diameter of the fluoride-based flux satisfy the following formula 2:

[inner diameter (mm) of discharge channel]$^2 \times$(travel distance (mm) of plunger in forward and backward movement directions)×(average particle diameter (μm) of fluoride-based flux)×1000<120    Formula 2.

2. The brazing material application method according to claim 1, wherein the inner diameter of the discharge channel is 0.1 mm or more.

3. The brazing material application method according to claim 1, wherein:
the discharge channel is partitioned into a plurality of partition channels;
among the plurality of partition channels, a partition channel having an outer opening is defined as a second channel, and a partition channel adjacent to the second channel is defined as a first channel; and
a ratio (inner diameter of the second channel/inner diameter of the first channel) between the inner diameter of the second channel and the inner diameter of the first channel is less than 1.

4. The brazing material application method according to or claim 3, wherein the ratio (inner diameter of the second channel/inner diameter of the first channel) between the inner diameter of the second channel and the inner diameter of the first channel is 0.8 or less.

5. The brazing material application method according to claim 1, wherein the average particle diameter of the fluoride-based flux is 20 μm or less.

6. The brazing material application method according to claim 1, wherein the brazing material is solid at 1 atm and 25° C., and the method includes a heating step of heating the brazing material to liquefy the brazing material.

7. The brazing material application method according to claim 1, further comprising a stirring step of stirring the liquid brazing material.

8. A manufacturing method of a metal member for brazing, comprising applying a coating of a brazing material onto a metal member by the brazing material application method according to claim 1 to manufacture the metal member for brazing.

* * * * *